United States Patent
Ichikawa (10) Patent No.: US 7,499,321 B2
(45) Date of Patent: Mar. 3, 2009

(54) SEMICONDUCTOR INTEGRATED CIRCUIT (75) Inventor: Tomoyuki Ichikawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 7 days.

(21) Appl. No.: 11/778,070

(22) Filed: Jul. 16, 2007

(65) Prior Publication Data
US 2008/0065817 A1  Mar. 13, 2008

(30) Foreign Application Priority Data
Sep. 13, 2006 (JP) ............................. 2006-248606

(51) Int. Cl.
G11C 11/34 (2006.01)
G11C 16/04 (2006.01)
G11C 7/00 (2006.01)

(52) U.S. Cl. .................... 365/185.04; 365/191; 365/194
(58) Field of Classification Search ................. 365/191, 365/194
See application file for complete search history.

(56) References Cited

U.S. PATENT DOCUMENTS 5,319,755 A * 6/1994 Farmwald et al. ........... 710/104
7,057,947 B2 * 6/2006 Kanda et al. ................ 365/200

FOREIGN PATENT DOCUMENTS

JP        2004234129        8/2004

* cited by examiner

Primary Examiner—Ly D Pham
(74) Attorney, Agent, or Firm—Volentine & Whitt, PLLC (57) ABSTRACT When a first reset signal is inputted, the reset control section outputs a second reset signal and an input/output control signal. The second reset signal is at a first logical level, and switches to a second logical level after a first period has passed. The input/output control signal is activated for a second period, before the first period has passed. The input/output port is connected with a controlled device and a mode identification signal generation unit which generates a mode identification signal corresponding to the controlled device. The input/output port functions as an input port only in the second period, to which the mode identification signal is inputted, and functions as an output port outside in the second period. The access control section implements switching of the operation mode and implements control of access to the controlled device on the basis of the mode identification signal from the input/output port.

6 Claims, 10 Drawing Sheets

|  | REGISTER 34e (8-BIT) | REGISTER 34f (8-BIT) | REGISTER 34g (8-BIT) |
|---|---|---|---|
| ftype=0 | XXXX XXXX (READ COMMAND CODE FOR FLASH MEMORY 21) | YYYY YYYY (WRITE COMMAND CODE FOR FLASH MEMORY 21) | ZZZZ ZZZZ (ERASE COMMAND CODE FOR FLASH MEMORY 21) |
| ftype=1 | X'X'X'X' X'X'X'X' (READ COMMAND CODE FOR FLASH MEMORY 22) | Y'Y'Y'Y' Y'Y'Y'Y' (WRITE COMMAND CODE FOR FLASH MEMORY 22) | Z'Z'Z'Z' Z'Z'Z'Z' (ERASE COMMAND CODE FOR FLASH MEMORY 22) |

SEMICONDUCTOR INTEGRATED CIRCUIT

CROSS-REFERENCE TO RELATED APPLICATION

This application claims priority under 35 USC 119 from Japanese Patent Application No. 2006-248606, the disclosure of which is incorporated by reference herein.

BACKGROUND OF THE INVENTION

1. Field of the Invention

The present invention relates to a semiconductor integrated circuit for implementing control of access to a controlled device (for example, a serial interface flash memory or the like), for example, a circuit structure for switching an operation mode in accordance with type or the like of a flash memory.

2. Description of the Related Art

Ordinarily, external memories (for example, serial interface flash memories, which are non-volatile memories formed such that writing, erasure and the like of information can be implemented electronically) that can be connected to a semiconductor integrated circuit featuring serial access functions (for example, a large-scale integrated circuit, below referred to as an LSI) feature unrelated command codes for different types of memory. A type can be identified with a command for reading identification information of a flash memory (below referred to as ID information), but a command code for the ID information reading command differs for the different types of flash memories. Therefore, identification of flash memory types cannot be performed with a common command code. A technology for solving this problem has been disclosed in, for example, Japanese Patent Application Laid-Open (JP-A) No. 2004-234129.

Therein, technology of a memory identification circuit for a semiconductor integrated circuit is disclosed. When an external memory (for example, a flash read-only memory, below referred to as a flash ROM) connected to a semiconductor integrated circuit featuring memory access functions is changed, it is necessary for setting of optimal control registers for the connected flash ROM by control code transfer software and for re-writing new control codes and the like from an external communications unit to random access memory (below referred to as RAM). Therefore, operations are complicated and universal applicability is lacking.

In order to solve these problems, the technology of JP-A No. 2004-234129 employs the following structure. In this structure, terminal states are identified by a plurality of terminals provided at the semiconductor integrated circuit which can be pulled-up/pulled-down, and a bus width is determined. A product number or the like is read from the flash ROM and the flash ROM is determined. A register of a control section provided in the semiconductor integrated circuit is set and specifications and the like are determined. Specifications which are required for access to the flash ROM, processing of terminals that are required for connection, and suchlike are set at this register.

With such a structure, there is no need for a central processing unit provided in the semiconductor integrated circuit (below referred to as a CPU) to preparatorily implement settings relating to connection of the flash ROM and execution of writing commands with control code transfer software. Therefore, there is an advantage in that it is possible to implement connection without performing complex processing. However, because of structure for reading the product number and the like from the flash ROM and determining the flash ROM, circuit structure and/or functioning of the semiconductor integrated circuit is more complicated.

As a technology for solving this problem, for example, a dedicated pin is provided at the exterior of the LSI and a signal for identifying a flash memory type is sent through this dedicated pin. An example of this structure is shown in FIG. 2.

Figure 2:
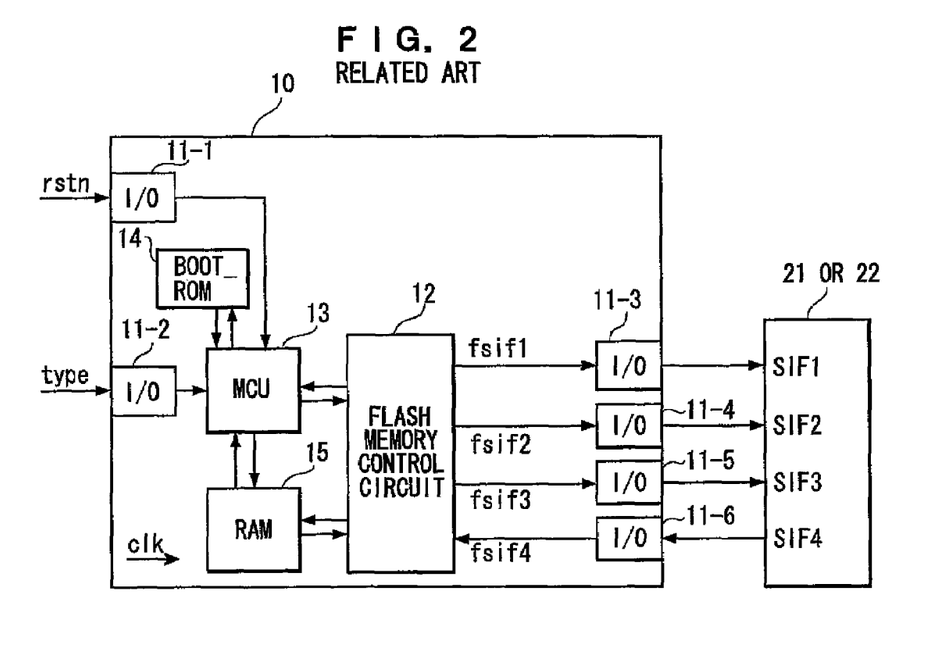
FIG. 2 is a schematic structural diagram showing an example of a conventional system LSI.

FIG. 2 is a schematic structural diagram showing an example of a conventional system LSI which is capable of accessing two types of serial interface flash memory.

This system LSI 10 is a system which is capable of accessing controlled devices 21 and 22 (for example, serial interface flash memories of two types for which command codes differ), and is provided with plural I/O cells 11-1 to 11-6, which are input/output ports (below referred to as I/O ports). Either one of the two types of flash memory 21 and 22 is connected to the IO cells 11-3 to 11-6. The flash memory 21 or 22 includes serial interface terminals SIF1 to SIF4, which are connected to the I/O cells 11-3 to 11-6. The flash memory 21 or 22 stores a program for operating the system LSI 10. Whichever of the flash memories 21 and 22 is connected to the system LSI 10, and the connecting pins at the system LSI 10 are same for either type.

The I/O cell 11-1 of the system LSI 10 is a circuit at which a negative polarity (Neg polarity) asynchronous reset signal 'rstn' is inputted from outside. This I/O cell 11-1 is connected to a flash memory control circuit 12, which is for controlling the flash memory 21 or 22, and a microcontroller (below referred to as an MCU) 13, at which a CPU, memory and peripheral functions are integrated for executing programs. The flash memory control circuit 12 includes functions for sending and receiving flash memory interface input signals fsif1 to fsif4 through the I/O cells 11-3 to 11-6, and sending and receiving signals to and from the MCU 13, and so forth.

The MCU 13 is connected to the flash memory control circuit 12 and is connected to a boot ROM (below referred to as BOOT_ROM) 14, a RAM 15, and the I/O cell 11-2. The BOOT_ROM 14 is a memory which retains a post-reset startup operation program, and is accessed by the MCU 13. The RAM 15 is a memory which retains a program for usual operations of the system LSI 10, and is accessed by the flash memory control circuit 12 and the MCU 13. The I/O cell 11-2 is a circuit which inputs a one-bit (below referred to as 'bit') identification signal 'type', which is for identifying the type of flash memory, from outside and supplies the identification signal type to the MCU 13.

The system LSI 10 includes circuits which are required for structuring a system LSI, such as a clock generation circuit for generating a clock signal clk and so forth. For simplicity of description, these are not illustrated.

Figure 3:
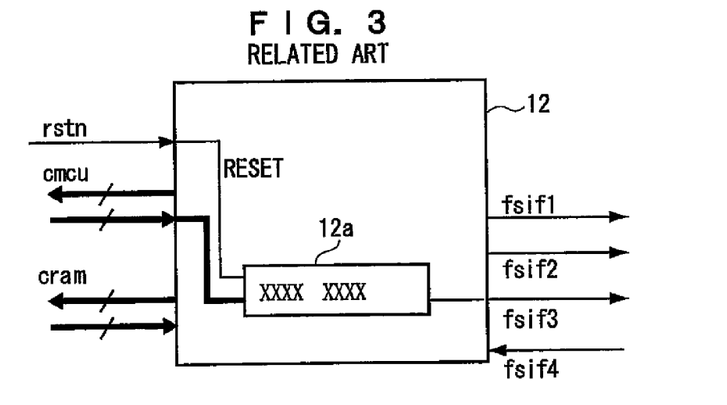
FIG. 3 is a schematic structural diagram showing the flash memory control circuit 12 of FIG. 2.

FIG. 3 is a schematic structural diagram showing the flash memory control circuit 12 of FIG. 2. This flash memory control circuit 12 is reset by the reset signal rstn. The flash memory control circuit 12 includes a register 12a of, for example, eight bits which stores a command code for a flash memory command that is to be executed. The flash memory control circuit 12 includes functions for sending and receiving signals such as flash memory interface input/output signals fsif1 to fsif4, which are for controlling the flash memory 21 or 22, a control signal cmcu, which is for controlling the MCU 13, and a control signal cRAM, which is for controlling the RAM 15. In this structure, for example, when a command to the flash memory 21 or 22 is to be implemented, the MCU 13 determines the flash memory type from the value of the identification signal type and writes the value of a command code to the register 12a.

Next, operations of the system LSI 10 shown in FIG. 2 and FIG. 3 will be schematically described.

In a process of identification of the flash memory 21 or 22 connected to the system LSI 10, for example, if the flash memory 21 is connected, a logical value '0' is provided from outside as the identification signal 'type', or if the flash memory 22 is connected, a logical value '1' is provided from outside as the identification signal type.

A program for usual operations of the system LSI 10 is stored at the flash memory 21 or 22. At the system LSI 10, after a reset of the flash memory control circuit 12 and the MCU 13 by the reset signal rstn, firstly, the MCU 13 executes the program in the BOOT_ROM 14 as a startup operation. In the BOOT_ROM 14, a program is stored, which is for reading out data in the flash memory 21 or 22 (which is the program for usual operations) and storing the data to the RAM 15. After the program from the flash memory 21 or 22 is stored to the RAM 15, the MCU 13 executes the program in the RAM 15.

For reading from the flash memory 21 or 22 in the startup operation, and for writing and reading operations respect to the flash memory 21 or 22 in usual operations, the MCU 13 executes commands to the flash memory 21 or 22 by controlling the flash memory control circuit 12.

Ordinarily, because command codes for the flash memories 21 and 22 differ depending on the flash memory types, the MCU 13 identifies the flash memory type from the value '1' or '0' of the identification signal inputted through the I/O cell 11-2, and writes a command code corresponding to this type to the register 12a in the flash memory control circuit 12. Hence, control in accordance with the flash memory type is implemented.

The flash memory control circuit 12 receives the control signal cmcu from the MCU 13 and controls the flash memory 21 or 22. In the case of reading from the flash memory 21 or 22, data read from the flash memory 21 or 22 is stored in the RAM 15. In the case of writing to the flash memory 21 or 22, data read from the RAM 15, described later, is written to the flash memory 21 or 22.

Figure 4:
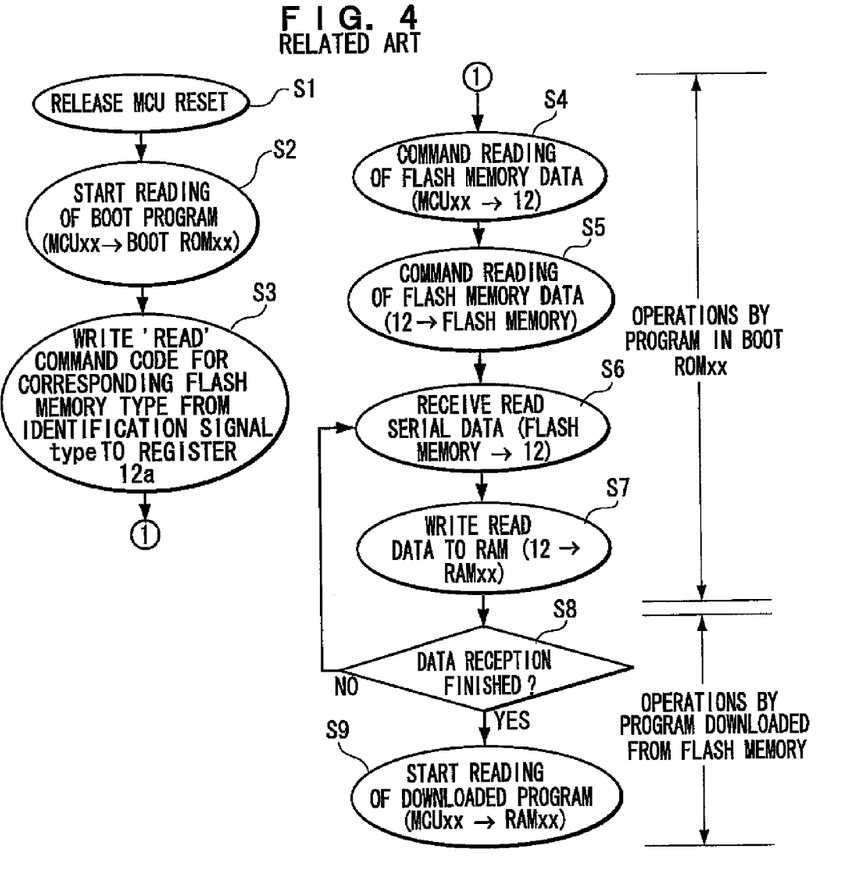
FIG. 4 is a flowchart showing operations (from MCU reset release to flash memory reading) of the system LSI 10 of FIG. 2.

FIG. 4 is a flowchart showing operations from a reset of the system LSI 10 of FIG. 2 until the program in the flash memory has been downloaded to the RAM 15 by the startup operation program of the BOOT_ROM 14. These operations will be described below.

When a reset signal rstn asserted at the MCU 13 is released (step S1), the MCU 13 reads the boot program for startup operations stored in the BOOT_ROM 14 and starts execution of this program (step S2).

Firstly, in operations of the program that was stored in the BOOT_ROM 14, from the value of the flash memory identification signal type (i.e., for example, '0'), the MCU 13 determines the type of the flash memory connected to the system LSI 10 (i.e., the flash memory 21) and stores a command code of a 'read' command corresponding to that type into the register 12a in the flash memory control circuit 12 (step S3). Then, the MCU 13 outputs an instruction for performing the command for reading flash memory data respect to the flash memory control circuit 12 (step S4). The flash memory control circuit 12 converts the data stored in the register 12a to serial data, and sends the data to the flash memory 21 (step S5). The flash memory 21, which has received this reading command, returns serial data to the flash memory control circuit 12 (step S6). The flash memory control circuit 12 converts the received serial data to parallel data and writes the data to the RAM 15 (step S7). When the program from in the flash memory 21 is completely stored in the RAM 15 (step S8), the reading command finishes, and the MCU 13 starts usual operations in accordance with the program that has been downloaded to the RAM 15 (step S9).

Although not shown in the flowchart, when another flash memory command, such as for data-writing or the like, is to be executed to the flash memory 21 or 22, similarly to the reading command, a command code is written to the register 12a in the flash memory control circuit 12, and execution of the command to the flash memory 21 or 22 is implemented with the command code corresponding to the type.

However, in the structure of FIG. 2, it is necessary to assign a dedicated pin of the I/O cell 11-2 for input of the type identification signal type for the flash memory 21 or 22. In the structural example of FIG. 2, the identification signal type requires one pin for selection of the two types, but the number of identification signal pins will increase in accordance with the number of corresponding types.

When type identification information is stored in the startup operation for type identification of the flash memory 21 or 22, there is no need for the type identification signal type to be inputted in subsequent operations. Therefore, in the conventional structure, because the dedicated pin(s) is/are assigned to the identification signal type which is required only in startup operations, chip size is wastefully increased. Apart from flash memory, this also arises with other controlled devices to be accessed by a semiconductor integrated circuit.

SUMMARY OF THE INVENTION

The present invention has been made in view of the above circumstances and provides a semiconductor integrated circuit.

According to an aspect of the invention, there is provided a semiconductor integrated circuit comprising: a reset control section that, when a first reset signal is inputted, outputs a second reset signal and an input/output control signal, the second reset signal being at a first logical level and, after expiration of a first period, switching to a second logical level, and the input/output control signal activating only during a second period, which is shorter than the first period, before the expiration of the first period; an input/output port that is connected with a controlled device and a mode identification signal generation unit which generates a mode identification signal corresponding to the controlled device, the input/output port functioning as an input port to input the mode identification signal only in the second period of the input/output control signal, and the input/output port functioning as an output port outside the second period; and an access control section that implements switching of an operation mode and implements control of access to the controlled device on the basis of the mode identification signal inputted by the input/output port by resetting by the first logical level of the second reset signal and the reset being released by the second logical level of the second reset signal.

BRIEF DESCRIPTION OF THE DRAWINGS

Preferred embodiments of the present invention will be described in detail based on the following figures, wherein.

DETAILED DESCRIPTION OF THE INVENTION

In a semiconductor integrated circuit which is capable of switching an operation mode (for example, a system LSI), a resistance is connected to a pin of an I/O cell, which is an I/O port to be used in usual operations, and pulls up or pulls down the pin. The system LSI includes a reset control section which implements input/output directional control of the pin. The system LSI acquires a logical value of the pull-up/pull-down into the system LSI by input/output directional control at a predetermined time, and uses this logical value to implement switching of the operation mode of the system LSI.

In a system LSI which performs switching of the operation mode in a startup operation after a reset, switching of the operation mode is executed by hardware during resetting of an access control section. Therefore, a startup operation program is unnecessary.

FIRST EMBODIMENT

Structure of the First Embodiment

Figure 1:
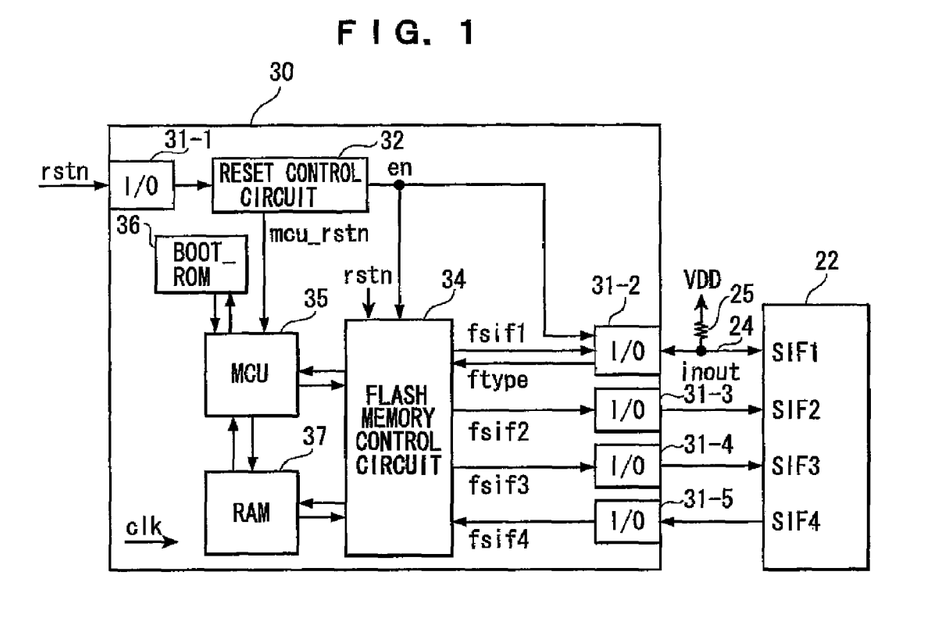
FIG. 1 is a schematic structural diagram of a system LSI illustrating a first embodiment of the present invention.

FIG. 1 is a schematic structural diagram of a semiconductor integrated circuit (for example, a system LSI) illustrating a first embodiment of the present invention.

Similarly to the conventional system LSI 10 of FIG. 2, this system LSI 30 is a system capable of accessing the controlled devices 21 and 22 (for example, two types of serial interface flash memory with different command codes). The system LSI 30 includes a number of I/O cells 31-1 and 31-3 to 31-5 similar to the conventional I/O cells 11-1 and 11-4 to 11-6, and the bidirectional I/O cell 31-2, which differs from the conventional I/O cells 11-2 and 11-3. The same as conventionally, either one of the two types of flash memory 21 and 22 is connected to these I/O cells 31-2 to 31-5.

The flash memory 21 or 22 includes serial interface terminals SIF1 to SIF4 which are connected to the I/O cells 31-2 to 31-5, the same as conventionally, and stores a program for operating the system LSI 30. Whichever of the flash memories 21 and 22 is connected to the system LSI 30, of the connecting pins at the system LSI 30, the same pins are used for either type.

In this first embodiment, specifically, the I/O cell 11-2 for inputting the conventional identification signal 'type' is removed and the bidirectional I/O cell 31-2 is provided instead. A signal line 24 for a signal 'inout', which connects this I/O cell 31-2 with the serial interface terminal SIF1 of the flash memory 21 or 22, is pulled up to '1' by being connected to a power supply terminal VDD via a mode identification signal generation unit 25 (for example, a resistance structuring a pull-up circuit). Although not illustrated, the signal line 24 may be pulled down to '0' by being connected to a ground voltage GND via the mode identification signal generation unit 25 (for example, by a resistance structuring a pull-down circuit). The '1' or '0' to which the resistance 25 is pulled up or pulled down corresponds to a value of a mode identification signal 'type' (for example, the conventional flash memory type identification signal). FIG. 1 is an example of a case in which the flash memory 22 is connected such that the signal is pulled up (to '1').

When the signal line 24 is not pulled up or pulled down by the resistance 25, the potential of the signal line 24 is determined by potentials of the flash memory 22 and the I/O cell 31-2 connected to two ends of the signal line 24. Thus, this signal line 24 will not be in a floating state.

The I/O cell 31-1 of the system LSI 30 is a circuit which inputs a first reset signal rstn (for example, a negative polarity (Neg polarity) asynchronous reset signal) from outside, the same as conventionally. Differently from conventionally, the newly added reset control section 32 (for example, a reset control circuit) is connected to this I/O cell 31-1. The reset control circuit 32 is a circuit which inputs the reset signal rstn provided from the I/O cell 31-1 and outputs, with predetermined timings, a second reset signal 'mcu_rstn' (for example, a negative polarity reset signal) and an input/output control signal 'en' (for example, a flash memory type identification enable signal). When this enable signal en is at '1', flash memory type identification is active.

The I/O cell 31-2 and the flash memory control circuit 34 for controlling the flash memory 21 or 22, with a structure different from conventionally, are connected to an output terminal of the reset control circuit 32 for the enable signal en. An MCU 35, including a CPU for executing programs substantially the same as conventionally, is connected to an output terminal of the reset control circuit 32 for the reset signal mcu_rstn. The flash memory control circuit 34 and the MCU 35 constitute an access control section.

The flash memory control circuit 34 includes functions for inputting the reset signal rstn from the I/O cell 31-1 and the reset signal mcu_rstn from the reset control circuit 32, sending and receiving flash memory interface input/output signals fsif1 to fsif4 through the I/O cells 31-2 to 31-5 and a mode identification signal 'ftype' (for example, a flash memory type identification signal), sending and receiving signals to and from the MCU 35, and the like.

The MCU 35 is connected to the reset control circuit 32 and the flash memory control circuit 34, and is connected to a BOOT_ROM 36 and a RAM 37. The BOOT_ROM 36, the same as conventionally, is a memory which retains a post-reset startup operation program, and is accessed by the MCU 35. The RAM 37, the same as conventionally, is a memory which retains a program for usual operations of the system LSI 30, and is accessed by the flash memory control circuit 34 and the MCU 35.

The system LSI 30, the same as conventionally, includes circuits which are required for structuring a system LSI, such as a clock generation circuit for generating a clock signal clk and so forth. However, for simplicity of description, these are not illustrated.

Figure 5:
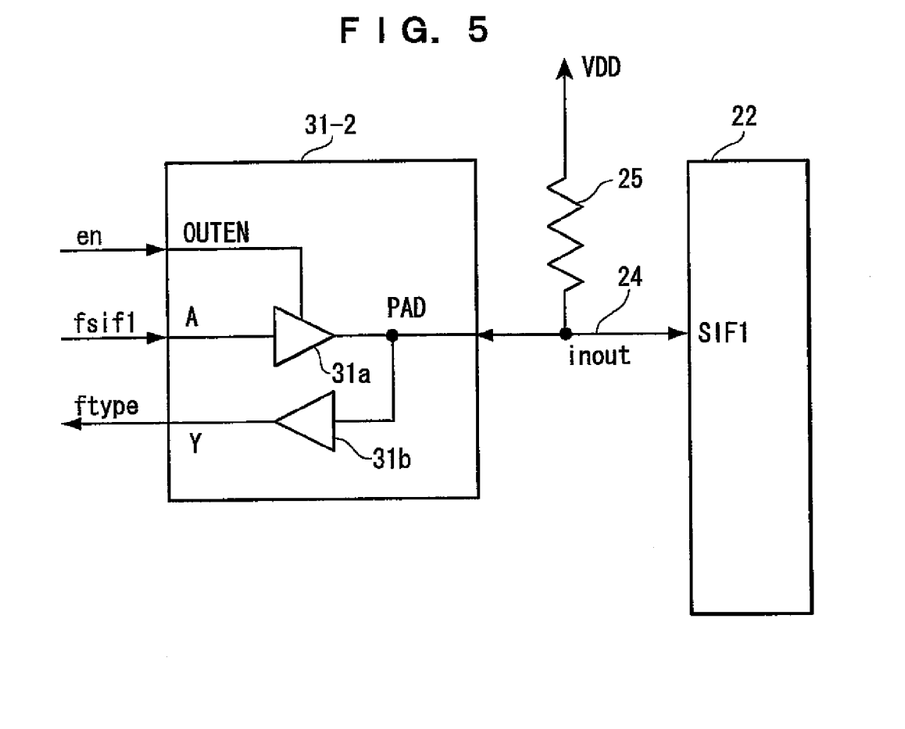
FIG. 5 is a schematic structural diagram showing a bidirectional I/O cell 31-2 of FIG. 1 and circuits peripheral thereto.

FIG. 5 is a schematic structural diagram showing the bidirectional I/O cell 31-2 of FIG. 1 and circuits peripheral thereto.

The bidirectional I/O cell 31-2 includes an output enable terminal OUTEN which inputs the enable signal en outputted from the reset control circuit 32, an input terminal A which inputs the flash memory interface input/output signal fsif1 outputted from the flash memory control circuit 34, an output terminal Y which outputs the flash memory type identification signal ftype, and a pad terminal PAD which is connected to the signal line 24 for the signal inout.

The input terminal A is connected to the pad terminal PAD via a tri-state buffer 31a. An enable terminal of this tri-state buffer 31a is connected to the output enable terminal OUTEN. The tri-state buffer 31a is a device which, when the output enable terminal OUTEN is at '0', is turned on, drives the signal fsif1 inputted from the input terminal A, and outputs the signal fsif1 to the pad terminal PAD, and which, when the output enable terminal OUTEN is at '1', the output side of the tri-state buffer 31a is in a high impedance state (a closed state). The pad terminal PAD is connected to the output terminal Y via a signal-driving buffer 31b.

At the bidirectional I/O cell 31-2, when the output enable signal OUTEN is at '0', the I/O cell 31-2 is directed outward and when the output enable terminal OUTEN is at '1', the I/O cell 31-2 is directed inward. When the I/O cell 31-2 is in the output direction, values of the pad terminal PAD and the output terminal Y are at the value of the input terminal A. That is, values of the signal inout of the pad terminal PAD and the identification signal ftype are at the value of the signal fsif1. When the I/O cell 31-2 is in the input direction, the value of the output terminal Y is the value of the pad terminal PAD. That is, the value of the identification signal ftype is the value of the signal inout of the pad terminal PAD. In FIG. 5, because the value of the signal inout is pulled up to the voltage of the power supply terminal VDD by the resistance 25, the value of the identification signal ftype is at '1'.

Figure 6:
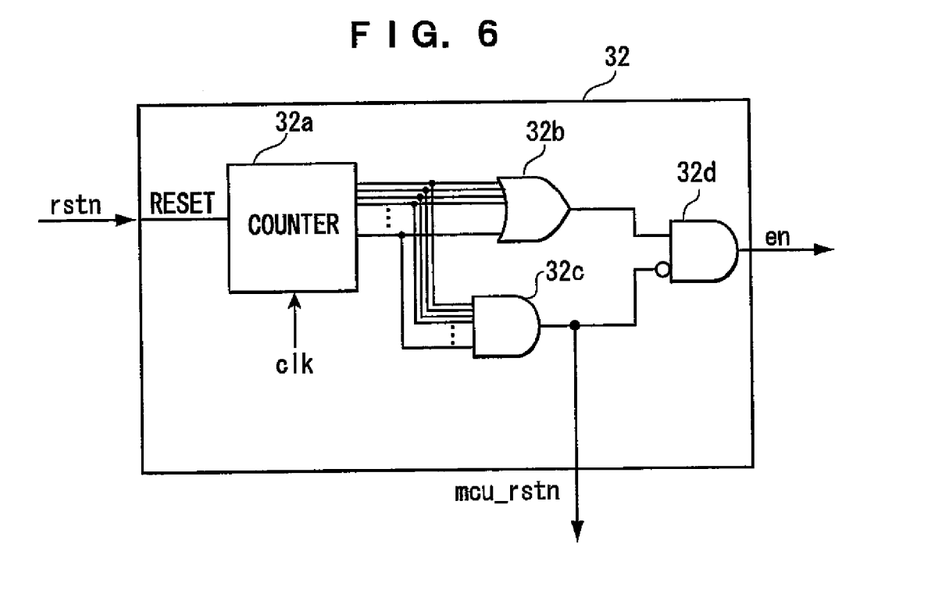
FIG. 6 is a schematic structural diagram showing a reset control circuit 32 of FIG. 1.

FIG. 6 is a schematic structural diagram showing the reset control circuit 32 of FIG. 1.

This reset control circuit 32 includes a counter 32a. At an output side thereof, a multiple-input, single-output logic disjunction gate (below referred to as an OR gate) 32b and a multiple-input, single-output logical conjunction gate (below referred to as an AND gate) 32c are connected. A two-input, single-output AND gate 32d is connected to an output side of the OR gate 32b and an inverted output side of the AND gate 32c.

When the reset signal rstn is asserted, the counter 32a resets a count value (a total) of the clock signal clk. After the reset is released, the counter 32a counts up to a certain count expiration value K, and retains the same value after count expiration. While the value of the counter 32a is between 1 and K−1, the flash memory type identification enable signal en outputted from the AND gate 32d is at '1', and at other times the enable signal en is at'0'. When the counter 32a reaches K, the reset signal mcu_rstn outputted from the AND gate 32c is set to reset release ('1'), and at other times is in the reset state ('0').

Figure 7:
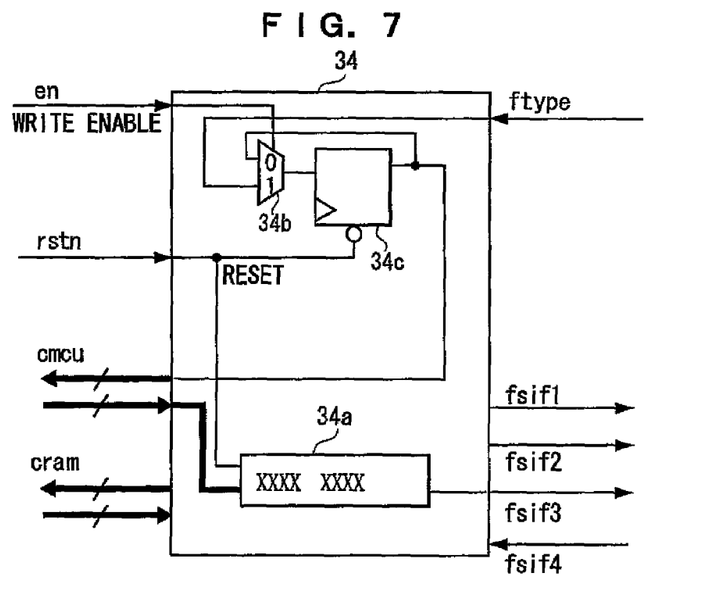
FIG. 7 is a schematic structural diagram showing a flash memory control circuit 34 of FIG. 1.

FIG. 7 is a schematic structural diagram showing the flash memory control circuit 34 of FIG. 1.

This flash memory control circuit 34 includes a register 34a of, for example, eight bits, the same as conventionally, which is reset by the reset signal rstn and stores a command code of a flash memory command to be executed. In addition, the flash memory control circuit 34 includes a newly added selector 34b and flash memory type identification information register 34c. The flash memory control circuit 34 has functions for sending and receiving the flash memory interface input/output signals fsif1 to fsif4 for controlling the flash memory 21 or 22, a control signal cmcu for controlling the MCU 35 and a control signal cram for controlling the RAM 37, and the like.

The register 34c is a circuit which operates synchronously with the clock signal clk. When the enable signal en is at '1', the identification signal ftype is selected by the selector 34b and the register 34c acquires the value of the identification signal ftype, and when the enable signal en is at '0', the register 34c retains this value, and the register 34c is reset by an inverted signal of the reset signal rstn.

Operation Mode Switching Process of the First Embodiment

Figure 8:
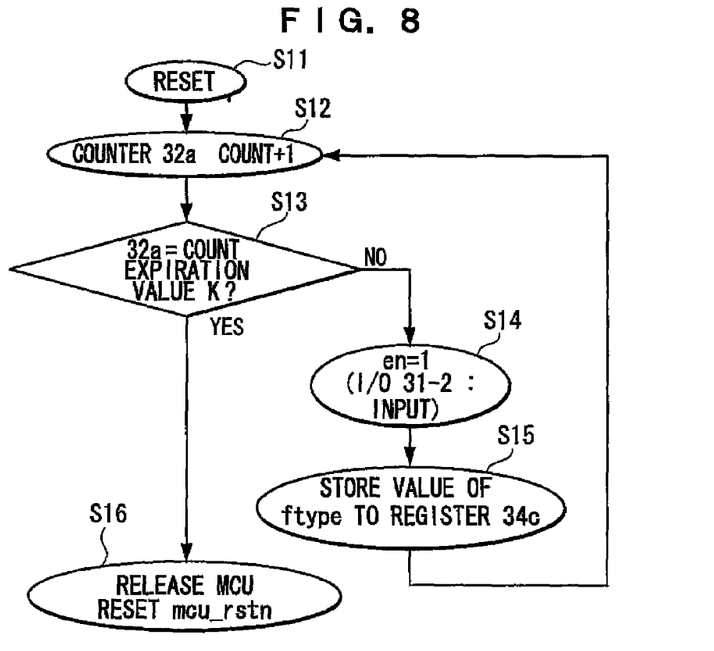
FIG. 8 is a flowchart showing a startup operation (flash memory type identification) at a system LSI 30 of FIG. 1.
Figure 9:
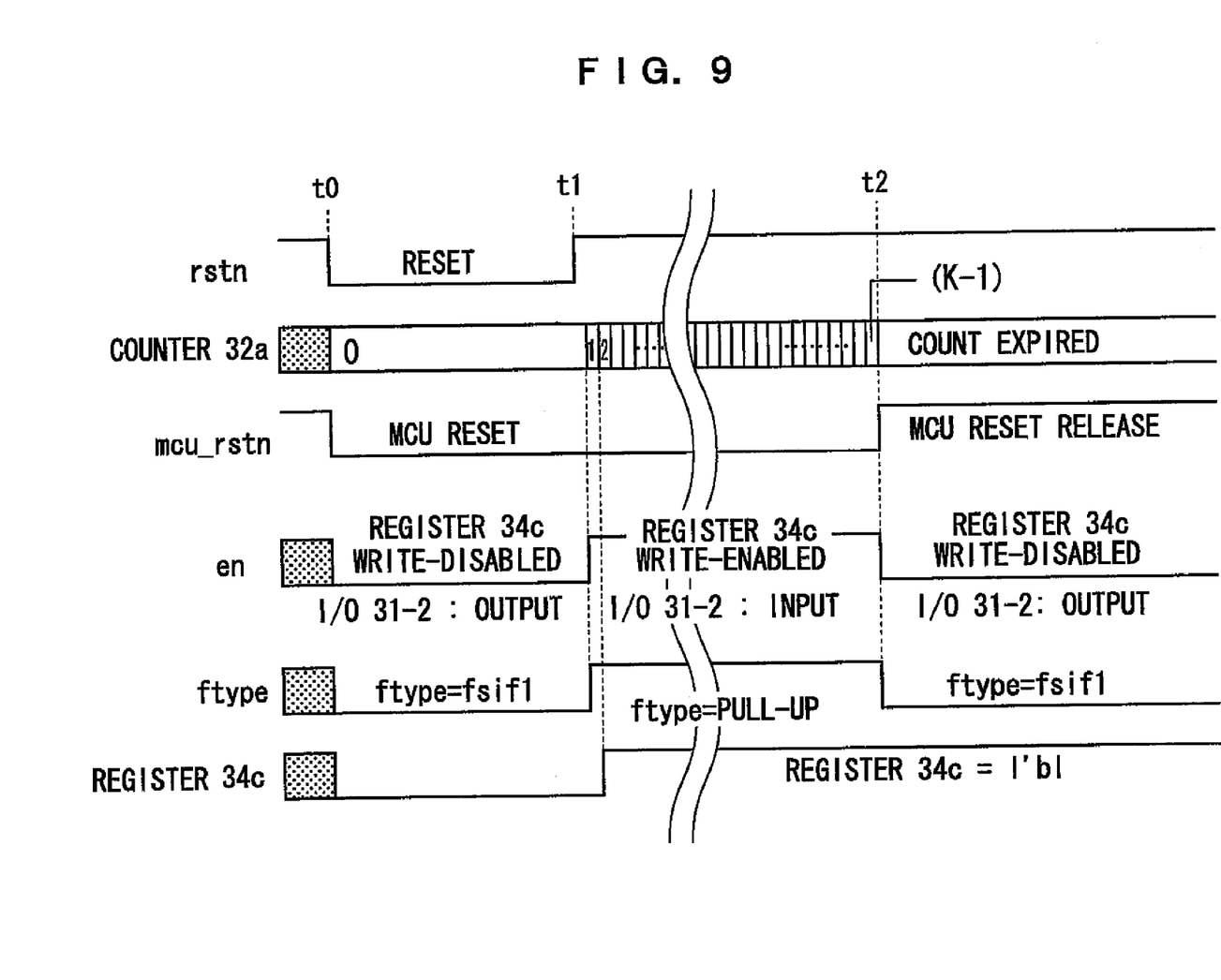
FIG. 9 is a timing chart showing the startup operation (flash memory type identification) of FIG. 1.

FIG. 8 is a flowchart showing a startup operation of the system LSI 30 of FIG. 1, from a reset release until type identification information of the flash memory 21 or 22 is stored to the register 34c in the flash memory control circuit 34. FIG. 9 is a timing chart showing the startup operation of FIG. 1 in correspondence with the flowchart of FIG. 8. In FIG. 9, from time t0 time t2 is a first period and from time t1 to time t2 is a second period.

At time t0 in FIG. 9, when the reset signal rstn inputted from outside is asserted (='0'), the reset signal passes through the I/O cell 31-1 and resets the counter 32a in the reset control circuit 32, and the count value is reset to zero (0). When this occurs, the reset signal mcu_rstn outputted from the AND gate 32c in the reset control circuit 32 goes to '0', and the enable signal en outputted through the AND gate 32d via the OR gate 32b goes to '0'.

When the reset signal mcu_rstn is at '0', the MCU 35 is reset. Because the enable signal en is at '0', the register 34c in the flash memory control circuit 34 retains a prior value, via the selector 34b, and is non-writable. Because the reset signal rstn is at '0', the registers 34a and 34c in the flash memory control circuit 34 are reset, and the flash memory interface input/output signal fsif1 and the like outputted from the register 34a go to '0'. Because the enable signal en is at '0', the tri-state buffer 31a in the I/O cell 31-2 is turned on, and because the signal fsif1 is at '0', the identification signal ftype goes to '0' (ftype=fsif1) via the tri-state buffer 31a, the signal-driving buffer 31b and the output terminal Y (step S11 in FIG. 8).

At time t1 in FIG. 9, when the reset signal rstn inputted from outside goes to '1', the reset is released, and the counter 32a in the reset control circuit 32 starts counting clock cycles (step S12 in FIG. 8). Until the count operation reaches an account expiration value K, the reset signal mcu_rstn outputted from the AND gate 32c stays asserted (='0'), and the MCU 35 does not commence startup operations.

In this period, while the value of the counter 32a is between 1 and K−1, the enable signal en outputted from the AND gate 32b is at '1' (step S14 in FIG. 8). Therefore, the output side of the tri-state buffer 31a in the bidirectional I/O cell 31-2 is in the high impedance state. Thus, input/output control of the I/O cell 31-2 is in the input direction, and the value of the identification signal ftype outputted from the signal-driving buffer 31b is at the value of the signal inout on the signal line 24.

Because this time is prior to driving of the flash memory 22, the signal inout is pulled up by the resistance 25, and thus the identification signal ftype is at '1'. Because the enable signal en is at '1', a '1' side of the selector 34b in the flash memory control circuit 34 is selected, and the register 34c is writable.

Therefore, the value '1' of the identification signal ftype is written, via the selector 34b, to the register 34c (step S15 in FIG. 8).

At time t2 in FIG. 9, when the value of the counter 32a in the reset control circuit 32 counts up to the count expiration value K (step S13 in FIG. 8), the reset signal mcu_rstn outputted from the AND gate 32c goes to '1' and the enable signal en outputted from the AND gate 32d goes to '0'. Because the reset signal mcu_rstn is at '1', the resetting of the MCU 35 is released (step S16 in FIG. 8). Because the enable signal en is at '0', a '0' side of the selector 34b in the flash memory control circuit 34 is selected, and the value of the register 34c is retained thereafter until a subsequent reset.

After time t2 in FIG. 9, after the count of the counter 32a expired the counts and the reset of the MCU 35 has been released by the reset signal mcu_rstn '1', the program in the flash memory 22 is downloaded to the RAM 37 by the startup operation program of the BOOT_ROM 36 in accordance with the conventional flowchart of FIG. 4.

Effects of the First Embodiment

According to the present first embodiment, a pin of the I/O cell 31-2 can be used for the flash memory interface input/output signal fsif1 at times of usual operation, with the role of the flash memory type identification signal ftype being assigned to the pin only during startup operations immediately after a reset, which is a flash memory non-operation period. Therefore, it is possible to structure the system LSI 30 to correspond to the plural types of flash memory 21 and 22 without increasing a number of pins.

In particular, in this first embodiment, after resetting of the system LSI 30 by the reset signal rstn which is inputted from outside, the value of the identification signal ftype for identifying the type of the flash memory 21 or 22 connected to the system LSI 30 is stored to the register 34c in the flash memory control circuit 34 in the period before expiration of the count by the counter 32a in the reset control circuit 32, and reading of the boot program is commenced thereafter. Therefore, the type of the flash memory 21 or 22 can be reliably registered in the system LSI 30. Thereafter, accesses to the flash memory 21 or 22 can be stably implemented.

SECOND EMBODIMENT

Structure of the Second Embodiment

Figure 10:
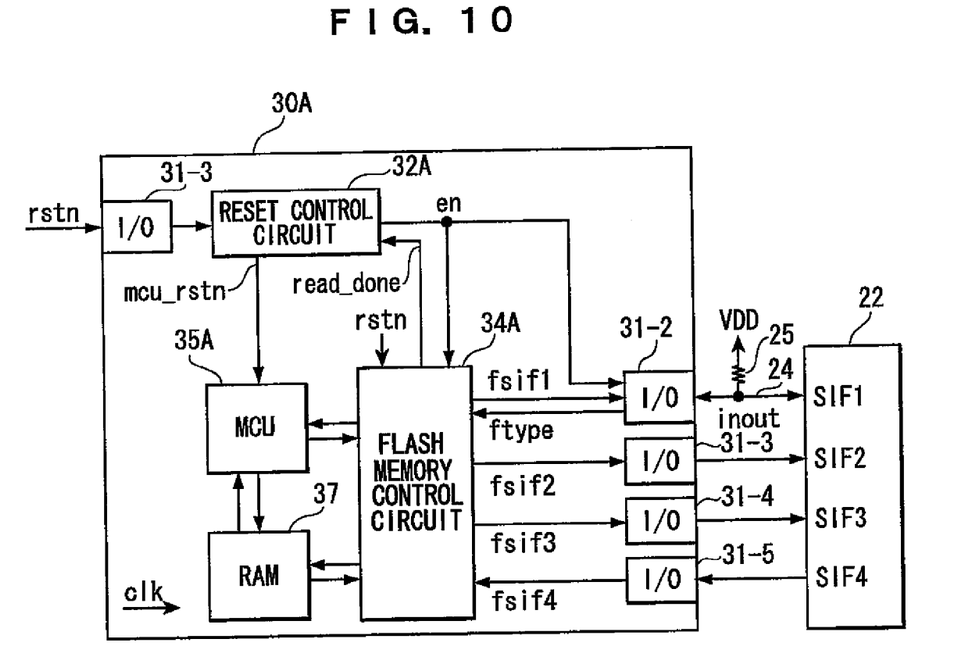
FIG. 10 is a schematic structural diagram of a system LSI showing a second embodiment of the present invention.

FIG. 10 is a schematic structural diagram of a semiconductor integrated circuit (for example, a system LSI) illustrating a second embodiment of the present invention. Elements in common with elements in FIG. 1 illustrating the first embodiment are assigned common reference numerals.

In the system LSI 30A of the second embodiment, the BOOT_ROM 36 of the first embodiment is removed and, instead of the reset control circuit 32, flash memory control circuit 34 and MCU 35 of the first embodiment, a reset control section (for example, a reset control circuit) 32A and an access control section (for example, a flash memory control circuit 34A and an MCU 35A) with different structures are provided. In place of software processing of the first embodiment that utilizes the BOOT_ROM 36, similar functions are realized by hardware processing.

The reset control circuit 32A is a circuit which inputs the reset signal rstn provided from the I/O cell 31-1 and a reading command completion signal read_done, which is provided from the flash memory control circuit 34A, and outputs, with predetermined timings, the reset signal mcu_rstn and the flash memory type identification enable signal en. When the enable signal en is at '1', flash memory type identification is active.

The reading command completion signal read_done is a signal indicating completion of a reading command in the startup operation immediately after a reset. The reading command completion signal read_done is at '0' at the time of reset and is at '1' after completion of the reading command of the startup operation.

The I/O cell 31-2, which is the same as in the first embodiment, and the flash memory control circuit 34A for controlling the flash memory 21 or 22, with a different structure from in the first embodiment, are connected to an output terminal of the reset control circuit 32A for the enable signal en. The MCU 35A, which includes a CPU for executing programs with different functions from the first embodiment, is connected to an output terminal of the reset control circuit 32A for the reset signal mcu_rstn.

The flash memory control circuit 34A includes functions for inputting the reset signal rstn from the I/O cell 31-1 and the flash memory type identification enable signal en from the reset control circuit 32, sending and receiving flash memory interface input/output signals fsif1 to fsif4 through the I/O cells 31-2 to 31-5 and the flash memory type identification signal ftype, providing the reading command completion signal read_done to the reset control circuit 32A, sending and receiving signals to and from the MCU 35A, and the like.

That is, the flash memory control circuit 34A has a circuit structure in which a flash memory type identification function for startup operations and a flash memory reading function are added to the flash memory control circuit 34 of the first embodiment, and the flash memory type identification and the flash memory reading operation that in the first embodiment are executed by software stored in the BOOT-ROM 35 are realized by hardware of the flash memory control circuit 34A.

Other structures are the same as in the first embodiment.

Figure 11:
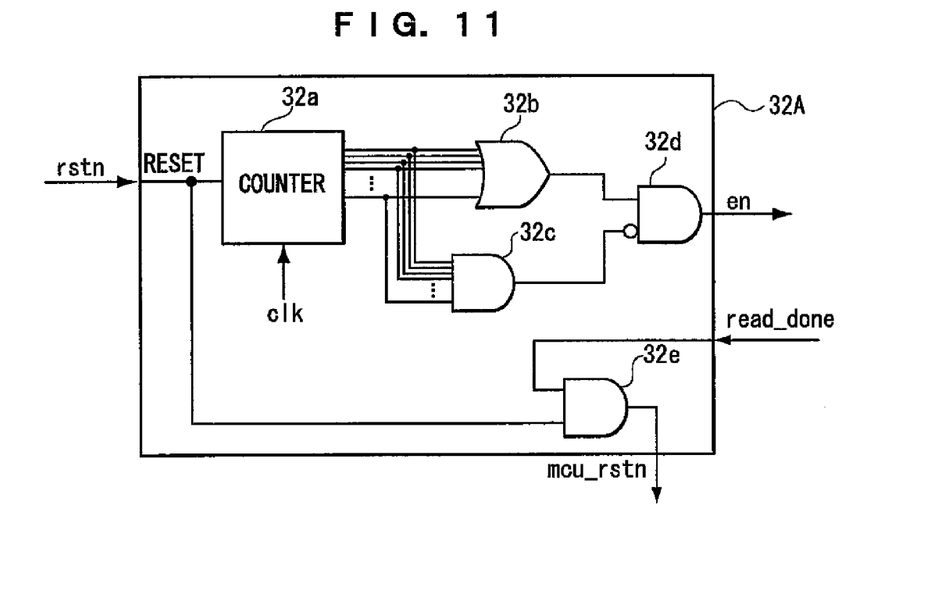
FIG. 11 is a schematic structural diagram showing a reset control circuit 32A of FIG. 10.

FIG. 11 is a schematic structural diagram showing the reset control circuit 32A of FIG. 10.

In this reset control circuit 32A, the reset signal mcu_rstn of the reset control circuit 32 of FIG. 6 of the first embodiment is generated by a newly added two-input AND gate 32e. That is, the AND gate 32e is a circuit which obtains a logical conjunction of the reset signal rstn, which is provided from the I/O cell 31-1, with the startup operation reading command completion signal read_done, which is provided from the flash memory control circuit 34A, and outputs the reset signal mcu_rstn. When the reading command completion signal read_done is at '0', the reset signal mcu_rstn is at '0' (MCU reset), and when the reading command completion signal read_done is at '1', the reset signal mcu_rstn is at '1' (MCU reset release).

Figure 12:
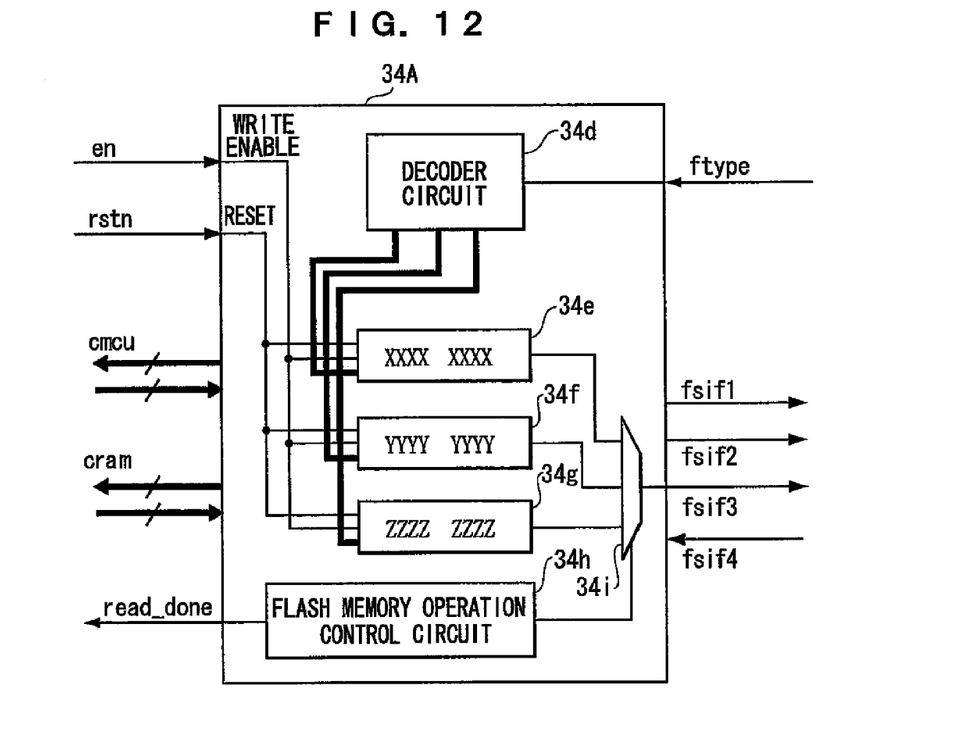
FIG. 12 is a schematic structural diagram showing a flash memory control circuit 34A of FIG. 10.

FIG. 12 is a schematic structural diagram showing the flash memory control circuit 34A of FIG. 10.

The flash memory control circuit 34A is provided with the decoder circuit 34d, which the flash memory type identification signal ftype is inputted to and includes a table for decoding command codes for each type of flash memory. An output side of the decoder circuit 34d is connected to, for example, each of eight-bit command code registers 34e, 34f and 34g, which are for storing command codes corresponding to the flash memory 21 or 22. These command code registers 34e, 34f and 34g are write-enabled by the enable signal en and are reset by the reset signal rstn.

The command code register 34e is a register which stores a 'read' command code for the flash memory 21 or 22, and after flash memory type identification, stores a command code corresponding to that type in accordance with a decoding result from the decoder circuit 34d. The command code register 34f is a register which stores a 'write' command code for the flash memory 21 or 22, and after flash memory type identification, stores a command code corresponding to that type in accordance with a decoding result from the decoder circuit 34d. The command code register 34g is a register which stores an 'erase' command code for the flash memory 21 or 22, and after flash memory type identification, stores a command code corresponding to that type in accordance with a decoding result from the decoder circuit 34d.

In this structure, an output signal from these command code registers 34e, 34f and 34g is selected by a selector 34i and outputted by any one of the flash memory serial interface input/output signals fsif1 to fsif4. A flash memory operation control circuit 34h is connected to the selector 34i. The flash memory operation control circuit 34h is a circuit which outputs a control signal for switching the output of the selector 34i, outputs the reading command completion signal read_done, and controls the flash memory control circuit overall.

Figure 13:
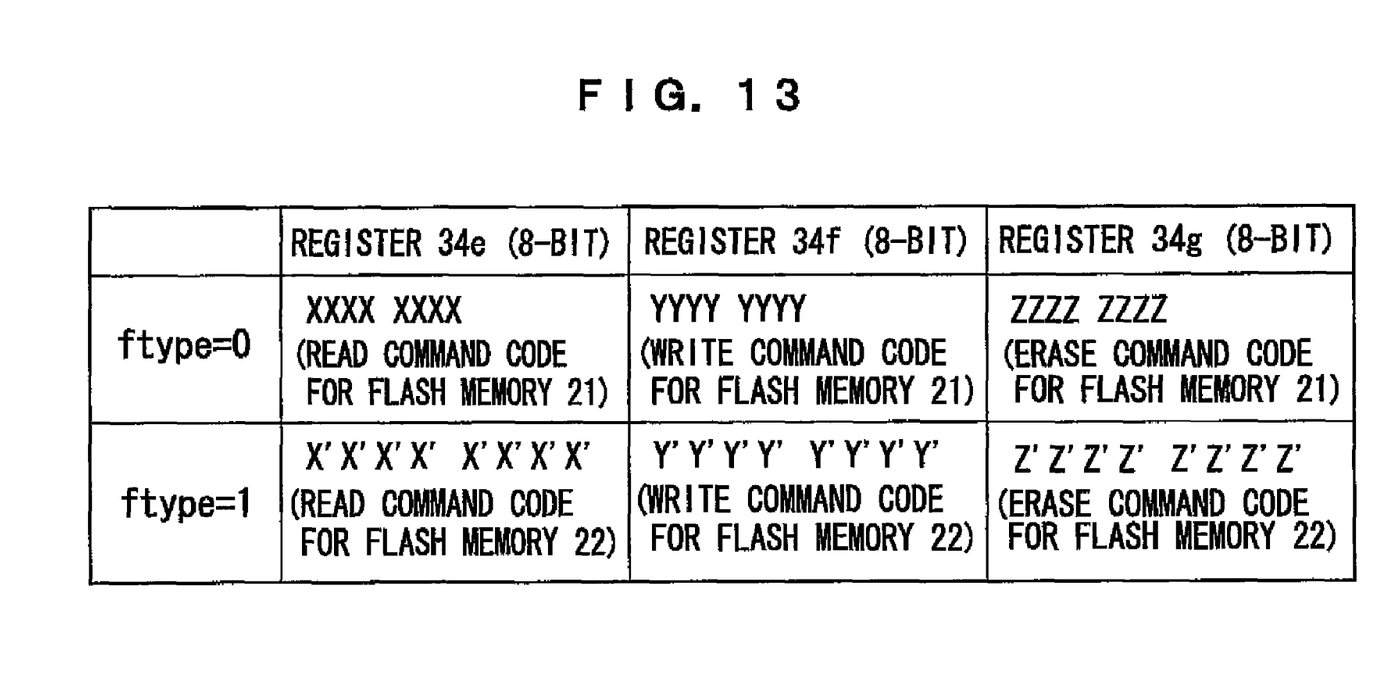
FIG. 13 is a diagram showing contents of a table in a decoder circuit 34d of FIG. 12.

FIG. 13 is a diagram showing contents of the table in the decoder circuit 34d of FIG. 12.

A read command code for the 8-bit command code register 34e, a write command code for the 8-bit command code register 34f and an erase command code for the 8-bit command code register 34g, which correspond to the flash memory 21 when the identification signal ftype is at '0', are stored in the decoder circuit 34d. Meanwhile, a read command code for the 8-bit command code register 34e, a write command code for the 8-bit command code register 34f and an erase command code for the 8-bit command code register 34g, which correspond to the flash memory 22 when the identification signal ftype is at '1', are stored in the decoder circuit 34d.

The decoder circuit 34d includes functions for determining values of the command codes in accordance with the value '0' or '1' of the identification signal ftype, and providing input values to the command code registers 34e, 34f and 34g that are to store the respective command codes.

Operation Mode Switching Process of the Second Embodiment

Figure 14:
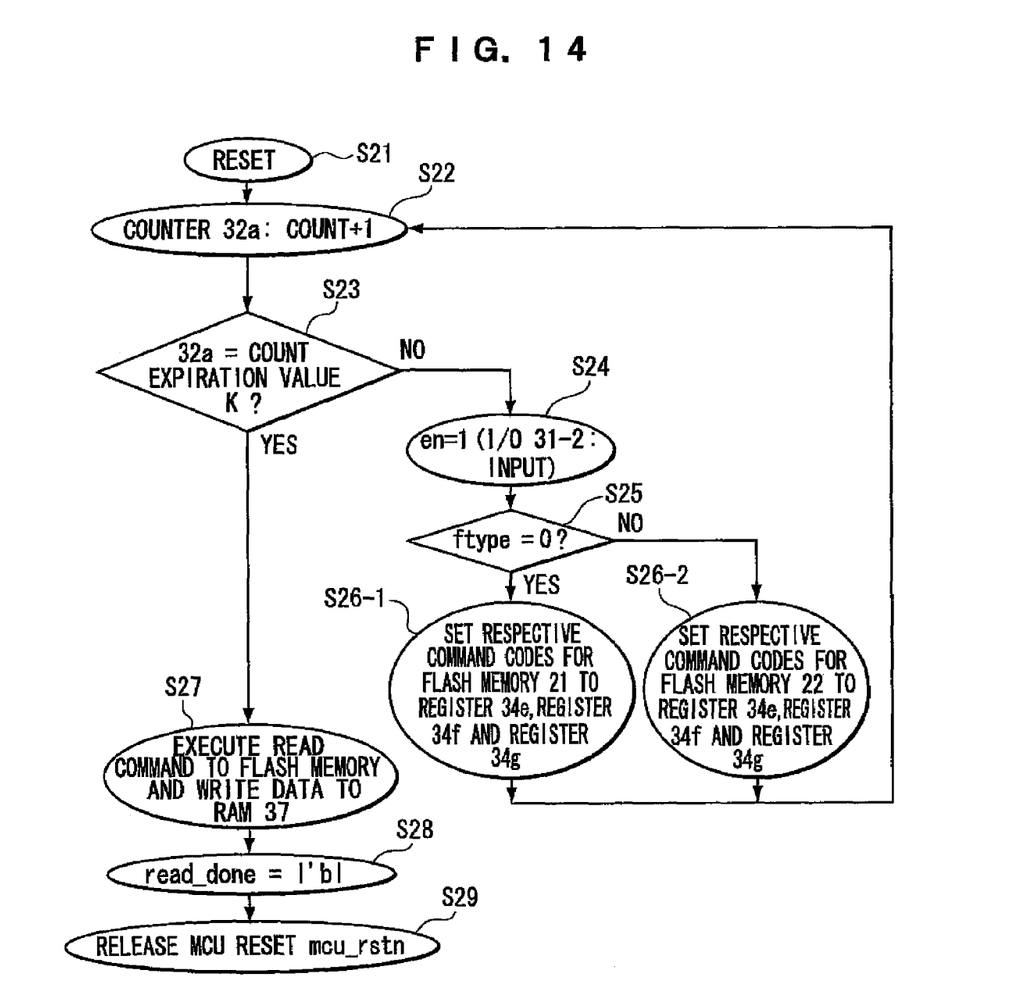
FIG. 14 is a flowchart showing a startup operation (from flash memory type identification to command code setting) at a system LSI 30A of FIG. 10.
Figure 15:
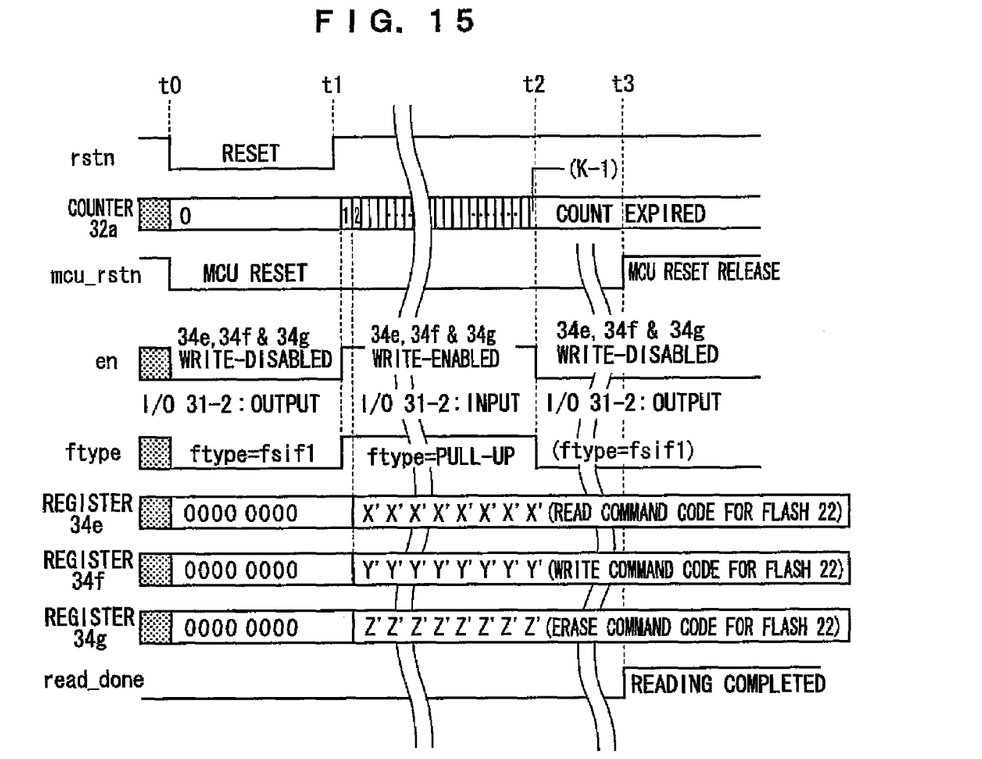
FIG. 15 is a timing chart showing the startup operation (from flash memory type identification to command code setting) of FIG. 10.

FIG. 14 is a flowchart showing a startup operation (from flash memory type identification to command code setting) in the system LSI 30A of FIG. 10. FIG. 15 is a timing chart showing the startup operation (from flash memory type identification to command code setting) of FIG. 10 in correspondence with the flowchart of FIG. 14.

At time t0 in FIG. 15, when the reset signal rstn inputted from outside is asserted (='0'), the reset signal passes through the I/O cell 31-1 and resets the counter 32a in the reset control circuit 32A, and the count value is reset to zero (0). Further, the reset signal mcu_rstn outputted from the AND gate 32e goes to '0'. When the count value is reset to '0', the enable signal en outputted through the AND gate 32d via the OR gate 32b and the AND gate 32e goes to '0'.

When the reset signal mcu_rstn is at '0', the MCU 35A is reset. Because the reset signal rstn is at '0', the command code registers 34e, 34f and 34g in the flash memory control circuit 34A are reset and, because the enable signal en is at '0', the command code registers 34e, 34f and 34g are write-disabled. When the command code registers 34e, 34f and 34g are reset, the flash memory interface input/output signal fsif1 and the like outputted from the selector 34i go to '0'. Because the enable signal en is at '0', the tri-state buffer 31a in the I/O cell 31-2 is turned on, and because the signal fsif1 is at '0', the identification signal ftype goes to '0' (ftype=fsif1) via the tri-state buffer 31a, the signal-driving buffer 31b and the output terminal Y (step S21 in FIG. 14).

At time t1 in FIG. 15, when the reset signal rstn inputted from outside goes to '1', the reset is released, and the counter 32a in the reset control circuit 32 starts counting clock cycles (step S22 in FIG. 14). The reading command completion signal read_done outputted from the flash memory operation control circuit 34h will be at '0' until reading is completed, so the reset signal mcu_rstn outputted from the AND gate 32e in the reset control circuit 32A stays asserted (='0'), and the MCU 35A is maintained in a reset state.

While the value of the counter 32a is between 1 and K−1 (step S23 in FIG. 14), the enable signal en outputted from the AND gate 32d is at '1' (step S24 in FIG. 14). Therefore, the output side of the tri-state buffer 31a in the bidirectional I/O cell 31-2 is in the high impedance state. Thus, input/output control of the I/O cell 31-2 is in the input direction, and the value of the identification signal ftype outputted from the buffer 31b is at the value of the signal inout on the signal line 24.

Because this time is prior to driving of the flash memory 22, the signal inout is pulled up by the resistance 25, and thus the identification signal ftype is at '1'. This is judged by the decoder circuit 34d (step S25 in FIG. 14), and because the enable signal en is at '1', command codes corresponding to the value '1' of the flash memory type identification signal ftype are written to the respective command code registers 34e, 34f and 34g (step S26-2 in FIG. 14). If the identification signal ftype was at '0', command codes corresponding to the value '0' of the flash memory type identification signal ftype would be written to the respective command code registers 34e, 34f and 34g (step S26-1 in FIG. 14).

At time t2 in FIG. 15, when the value of the counter 32a in the reset control circuit 32A counts up to the count expiration value K (step S23 in FIG. 14), the enable signal en outputted from the AND gate 32d goes to '0', and the values of the command code registers 34e, 34f and 34g are retained thereafter until a subsequent reset.

At the time t2 in FIG. 15, when the counter 32a reaches the count expiration, a flash memory reading command is executed by the flash memory control circuit 34A using the command code stored in the command code register 34e. Data of a usual program is read out from the flash memory 22 and is written to the RAM 37 (step S27 in FIG. 14).

At time t3 in FIG. 15, when the flash memory reading command is completed, the value of the reading command completion signal read_done outputted from the flash memory operation control circuit 34h goes to '1' (step S28 in FIG. 14), the reset signal mcu_rstn outputted from the AND gate 32e in the reset control circuit 32A goes to '1', and resetting of the MCU 35A is released (step S29 in FIG. 14). Thereafter, the MCU 35A commences usual operations using the usual program stored in the RAM 37.

The flowchart of FIG. 14 shows a sequence of operations, from the processing of the flowchart of FIG. 8 for the first embodiment until the subsequent processing of the flowchart of FIG. 4, which is realized by the hardware of the flash memory control circuit 34A.

Effects of the Second Embodiment

According to the present second embodiment, identification of a flash memory type and reading of a program from the flash memory 21 or 22 are realized by hardware at the flash memory control circuit 34A. Therefore, the BOOT_ROM 36 for storing the startup operation program, which is necessary for the first embodiment, is not required. Therefore, it is not necessary to reserve the BOOT_ROM 36, which is an area in ROM, and the system LSI 30A can be structured (substituted) with, for example, random logic or the like. Therefore, layout is more efficient, and a reduction in size of the circuit can be expected. Moreover, because the startup operations are not software operations using a boot program but are implemented by the hardware of the flash memory control circuit 34A, an increase in speed of the operations can be expected.

VARIANT EXAMPLES

The present invention is not limited to the above-described first and second embodiments, and various utility modes and variants are possible. Such utility modes and variant examples include, for example, the following (a) to (g).

(a) In the first and second embodiments, the signal inout is pulled up to the power supply voltage by the resistance 25 and '1' is inputted to the I/O cell 31-2. However, it is also possible for the resistance 25 to be pulled down to the ground voltage and input '0'. In the following descriptions, 'pull-down' may be employed in place of 'pull-up'.

(b) In the first and second embodiments, the pin of the I/O cell that is connected to the resistance 25 has been described as being at the I/O cell 31-2 which is connected with the flash memory 21 or 22. However, the present invention is not limited thus. Although not illustrated, any pin may be employed as long as it is a pin of an I/O cell which is provided at the system LSI 30 or 30A and which can control the input/output direction.

(c) For the first and second embodiments, it has been described that the timing for acquiring a logical value of the pull-up by the resistance 25 is during the resetting of the MCU 35 or 35A after the release of the reset signal rstn from outside. However, a timing for acquiring the logical value of the pull-up is not limited to the reset time, as long as the timing is during a state in which control of the input/output direction of the pin of the I/O cell 31-2 that is pulled up.

(d) In the first embodiment, the logical value of the pull-up by the resistance 25 is employed as the flash memory type identification signal ftype. However, this value is more generally employable as an operation mode switching signal of the system LSI 30. In such cases, there is no need for the system LSI 30 to be a system LSI that is connected to the flash memory 21 or 22. A semiconductor integrated circuit which connects controlled devices such as other memories and the like other than flash memory may be employed. Instead of the system LSI 30 or 30A, another semiconductor integrated circuit such as an IC, a VLSI or the like may be employed.

(e) In the first and second embodiments, only the one pin of the I/O cell 31-2 is pulled up by the resistance 25. However, the present invention is not limited in a number of pins to be employed, and plural pins may be employed. If the number of pins to be employed is N, according to combinations of pull-ups and pull-downs for the respective pins, mode identification for $2^N$ types may be possible.

(f) In the second embodiment, three flash memory registers for storing flash memory command codes are used (the command code registers 34e, 34f and 34g). However, any number of command codes to be used and storing registers may be employed.

(g) In the second embodiment, the registers 34e, 34f and 34g are used for storing the flash memory command codes. However, rather than using registers for storing the command codes, a structure may be possible which employs the register 34c that stores the flash memory type identification signal ftype of the first embodiment, and executes commands by decoding a command code from the decoder circuit 34d with the value in the register 34c on each occasion of command execution.

Embodiments of the present invention are described above, but the present invention is not limited to the embodiments as will be clear to those skilled in the art.

In a first aspect of a semiconductor integrated circuit of the present invention, a reset control section, an I/O port and an access control section are provided. When a first reset signal is inputted to the reset control section, the reset control section outputs a second reset signal and an input/output control signal. The second reset signal is at a first logical level and, after expiration of a first period, switches to a second logical level. The input/output control signal activates only during a second period, which is shorter than the first period, before the expiration of the first period.

The I/O port is connected with a controlled device and a mode identification signal generation unit that generates a mode identification signal corresponding to the controlled device. The I/O port functions as an input port to input the mode identification signal only in the second period of the input/output control signal, and functions as an output port outside the second period. The access control section is reset by the first logical level of the second reset signal, and the reset is released by the second logical level of the second reset signal. On the basis of the mode identification signal inputted by the I/O port, the access control section implements switching of an operation mode and implements control of access to the controlled device.

According to the above configuration, the role of a mode identification signal is provided to the I/O port, which is used, for example, for an interface input/output signal to the controlled device at times of usual operation, and while, only in a startup operation period immediately after the reset, which is a controlled device non-operation period. Therefore, it is possible to structure a semiconductor integrated circuit corresponding to controlled devices of a plurality of modes without increasing a number of pins at the I/O port. In particular, after the semiconductor integrated circuit is reset by the inputted first reset signal, the mode identification signal for identifying the operation mode of the controlled device connected to the semiconductor integrated circuit is inputted through the I/O port before expiration of the first period according to the reset control section. Subsequently, switching of the operation mode is performed and control of access to the controlled device is implemented in accordance with this mode identification signal. Thus, the operation mode of the controlled device can be reliably identified and access to the controlled device thereafter can be performed stably.

What is claimed is:

1. A semiconductor integrated circuit comprising:
   a reset control section that, when a first reset signal is inputted, outputs a second reset signal and an input/output control signal, the second reset signal being at a first logical level and, after expiration of a first period, switching to a second logical level, and the input/output control signal activating only during a second period, which is shorter than the first period, before the expiration of the first period;
   an input/output port that is connected with a controlled device and a mode identification signal generation unit which generates a mode identification signal corresponding to the controlled device, the input/output port functioning as an input port to input the mode identification signal only in the second period of the input/output control signal, and the input/output port functioning as an output port outside the second period; and
   an access control section that implements switching of an operation mode and implements control of access to the controlled device on the basis of the mode identification signal inputted by the input/output port by resetting by the first logical level of the second reset signal and the reset being released by the second logical level of the second reset signal.

2. The semiconductor integrated circuit of claim 1, wherein the first period is specified by a count value of a counter.

3. The semiconductor integrated circuit of claim 1, wherein the access control section implements the switching of the operation mode on the basis of the mode identification signal by one of software or hardware.

4. The semiconductor integrated circuit of claim 1, wherein
the controlled device comprises a memory,
the mode identification signal is a memory type identification signal for identifying a type of the memory, and
the access control section identifies the type of the memory on the basis of the memory type identification signal, and implements the switching of the operation mode and implements control of access to the memory on the basis of an identification result.

5. The semiconductor integrated circuit of claim 4, wherein the mode identification signal generation unit comprises at least one of a pull-up circuit or a pull-down circuit for generating the memory type identification signal.

6. The semiconductor integrated circuit of claim 4, wherein the memory comprises a flash memory.

* * * * *